(12) United States Patent
Lebreux et al.

(10) Patent No.: US 10,840,570 B2
(45) Date of Patent: *Nov. 17, 2020

(54) BATTERY PACK CONTAINING PHASE CHANGE MATERIAL

(71) Applicant: CONSORTIUM DE RECHERCHE BRP—UNIVERSITE DE SHERBROOKE S.E.N.C., Sherbrooke (CA)

(72) Inventors: Normand Lebreux, Sherbrooke (CA); Eric Menard, Sherbrooke (CA)

(73) Assignee: CONSORTIUM DE RECHERCHE BRP—UNIVERSITE DE SHERBROOKE S.E.N.C., Sherbrooke (CA)

( * ) Notice: Subject to any disclaimer, the term of this patent is extended or adjusted under 35 U.S.C. 154(b) by 71 days.

This patent is subject to a terminal disclaimer.

(21) Appl. No.: 16/158,410

(22) Filed: Oct. 12, 2018

(65) Prior Publication Data

US 2019/0051955 A1  Feb. 14, 2019

Related U.S. Application Data

(62) Division of application No. 15/546,232, filed as application No. PCT/IB2016/050511 on Feb. 1, 2016, now Pat. No. 10,128,550.

(Continued)

(51) Int. Cl.
*H01M 10/625* (2014.01)
*H01M 10/659* (2014.01)
(Continued)

(52) U.S. Cl.
CPC ........... *H01M 10/659* (2015.04); *B60L 50/64* (2019.02); *B60L 50/66* (2019.02); *B60L 58/18* (2019.02);
(Continued)

(58) Field of Classification Search
CPC ............ H01M 10/659; H01M 2/1077; H01M 10/625; H01M 10/613; H01M 2/206; H01M 2/34; H01M 2220/20; C09K 5/063
See application file for complete search history.

(56) References Cited

U.S. PATENT DOCUMENTS 5,931,245 A   8/1999  Uetake et al.
6,468,689 B1  10/2002 Al-Hallaj et al.
(Continued)

FOREIGN PATENT DOCUMENTS

CA    2906442 A1   10/2014
CN  102810878 A   12/2012
(Continued)

OTHER PUBLICATIONS

Chinese Office Action and its English translation of corresponding Chinese Application No. 2016800081627; dated Jul. 26, 2019; Cal Tingting.

(Continued)

*Primary Examiner* — Cynthia K Walls
(74) *Attorney, Agent, or Firm* — BCF LLP

(57) ABSTRACT

A battery pack for a vehicle is presented. The battery pack comprises a plurality of bricks, each brick of the plurality of bricks comprising a phase change material block, a side of the phase change material block defining a plurality of channels, and a plurality of battery cells, each battery cell being disposed at least in part in the phase change material block; and at least one connector for electrically connecting a first one of the plurality of bricks to a second one of the plurality of bricks, the at least one connector being disposed at least partially in one of the plurality of channels.

7 Claims, 13 Drawing Sheets

Related U.S. Application Data

(60) Provisional application No. 62/109,970, filed on Jan. 30, 2015.

(51) Int. Cl.

| | |
|---|---|
| *C09K 5/06* | (2006.01) |
| *H01M 2/10* | (2006.01) |
| *H01M 2/20* | (2006.01) |
| *H01M 10/613* | (2014.01) |
| *H01M 2/34* | (2006.01) |
| *B60L 50/64* | (2019.01) |
| *B60L 58/18* | (2019.01) |
| *B60L 50/60* | (2019.01) |

(52) U.S. Cl.
CPC ........... *C09K 5/063* (2013.01); *H01M 2/1077* (2013.01); *H01M 2/206* (2013.01); *H01M 2/34* (2013.01); *H01M 10/613* (2015.04); *H01M 10/625* (2015.04); *H01M 2200/00* (2013.01); *H01M 2220/20* (2013.01); *Y02T 10/705* (2013.01); *Y02T 10/7005* (2013.01)

(56) References Cited

U.S. PATENT DOCUMENTS

| | | | |
|---|---|---|---|
| 6,942,944 B2 | 9/2005 | Al-Hallaj et al. | |
| 8,273,474 B2 | 9/2012 | Al-Hallaj et al. | |
| 2003/0054230 A1 | 3/2003 | Al-Hallaj et al. | |
| 2006/0177738 A1* | 8/2006 | Godevais | H01M 4/133 |
| | | | 429/231.9 |
| 2009/0169983 A1 | 7/2009 | Kumar et al. | |
| 2010/0151300 A1 | 6/2010 | Gutsch et al. | |
| 2011/0293986 A1 | 12/2011 | Kozu | |
| 2012/0003523 A1 | 1/2012 | Schaller et al. | |
| 2012/0258337 A1 | 10/2012 | Wang | |
| 2014/0079978 A1 | 3/2014 | Al-Hallaj et al. | |
| 2015/0064514 A1 | 3/2015 | Wu | |

FOREIGN PATENT DOCUMENTS

| | | |
|---|---|---|
| CN | 203787999 U | 8/2014 |
| DE | 102012018344 B3 | 9/2013 |
| DE | 102012220549 A1 | 5/2014 |
| EP | 2830187 A1 | 1/2015 |

OTHER PUBLICATIONS

English Abstract of DE102012018344; Retrieved on Nov. 19, 2018; Retrieved from www.worldwide.espacenet. com.
European Search Report of Corresponding European Application No. EP18192811.0; Munich; dated Nov. 12, 2018; Topalov, Angel.
English Abstract of CN102810878; Retrieved on Jul. 17, 2017; Retrieved from www.worldwide.espacenet.com.
English Abstract of CN203787999; Retrieved on Jul. 17, 2017; Retrieved from www.worldwide.espacenet.com.
English Abstract of DE102012220549; Retrieved on Oct. 11, 2018; Retrieved from www.worldwide.espacenet.com.
Rao et al., "Simulation and experiment of thermal energy management with phase change material for ageing LiFePO4 power battery", Energy Conversion and Management, vol. 52, Issue 12, 2011, pp. 3408-3414.
Rao et al., "A review of power battery thermal energy management", Renewable and Sustainable Energy Reviews, vol. 15, No. 9, 2011, pp. 4554-4571.
Ling et al., "Review on thermal management systems using phase change materials for electronic components, Li-ion batteries and photovoltaic modules", Renewable and Sustainable Energy Reviews, vol. 31, 2014, pp. 427-438.
International Search Report of PCT/IB2016/050511; dated Apr. 22, 2016; Philip Gbor.
International Preliminary Report on Patentability of PCT/IB2016/050511; dated May 17, 2017; Philip Gbor.
Supplementary Partial Search Report of EP16742879.6; dated Sep. 11, 2017; Angel Topalov; Munich.

* cited by examiner

BATTERY PACK CONTAINING PHASE CHANGE MATERIAL

CROSS-REFERENCE

The present application is a divisional application of U.S. patent application Ser. No. 15/546,232, filed Jul. 25, 2017, which is a national stage entry of International Application No. PCT/IB2016/050511, filed Feb. 1, 2016, which claims priority to U.S. Provisional Patent Application No. 62/109,970, filed Jan. 30, 2015. The entirety of each application is incorporated herein by reference.

FIELD OF TECHNOLOGY

The present technology relates to rechargeable battery packs for use in vehicles.

BACKGROUND

It is known to use phase-change materials (PCM) for thermal management of battery packs. For example, U.S. Pat. No. 6,468,689 (Al-Hallaj et al.), U.S. Pat. No. 6,942,944 (Al-Hallaj et al.) and U.S. Pat. No. 8,273,474 (Al-Hallaj et al.), all issued to Allcell, each disclose a PCM comprising a paraffin wax for use in a pack comprising rechargeable battery cells. Each of these patents is incorporated herein by reference.

An example of such a PCM material is the Phase Change Composite (PCC™) thermal management material from AllCell Technologies LLC.

SUMMARY

It is an object of the present technology to improve current rechargeable battery packs, in particular for use in vehicles such as motorcycles, all-terrain-vehicles, snowmobiles, personal watercraft and the like.

In one aspect, implementations of the present technology provide a battery pack comprising:
  a plurality of modules connected in series, each module having a nominal voltage of between 18 Vdc and 32 Vdc, the plurality of modules having a combined nominal voltage of between 84 Vdc and 112 Vdc, each module comprising between six and 20 bricks connected in series, each brick comprising:
  between ten and 60 electrochemical cells connected in parallel; and
a phase change material for dissipating at least a portion of heat generated upon activation of at least a portion of the electrochemical cells, the phase change material at least in part enveloping the electrochemical cells.

In another aspect, implementations of the present technology provide a battery pack comprising:
  a plurality of electrochemical cells having a $T_{max\text{-}charge}$ and
  a phase change material for dissipating at least a portion of heat generated upon activation of at least a portion of the electrochemical cells, the phase change material at least in part enveloping the electrochemical cells, the phase change material having a $T_{melt} < T_{max\text{-}charge}$.

In another aspect, implementations of the present technology provide a battery pack comprising a plurality of bricks connected in series, each brick comprising:
  a plurality of electrochemical cells, and
  a phase change material for dissipating at least a portion of heat generated upon activation of at least a portion of the electrochemical cells, the phase change material at least in part enveloping the electrochemical cells, the plurality of electrochemical cells being disposed in an alternating pattern within the phase change material,
  wherein the alternating pattern enables the formation of channels between at least some of the electrochemical cells, and
  wherein the battery pack further comprises connectors for conductively connecting adjacent bricks, the connectors being disposed within the channels.

In another aspect, implementations of the present technology provide a battery pack comprising:
  a plurality of electrochemical cells,
  a phase change material for dissipating at least a portion of heat generated upon activation of at least a portion of the electrochemical cells, the phase change material at least in part enveloping the electrochemical cells,
  a housing for containing the plurality of electrochemical cells and the phase change material, the housing made of a metallic material, and
  a layer of thermally conductive adhesive between the at least a part of the phase change material and the housing.

According to another aspect of the present technology, there is provided a battery brick for a vehicle, comprising a phase change material having a melting temperature; and a plurality of battery cells, each battery cell of the plurality of battery cells being disposed at least in part in the phase change material, the plurality of battery cells having a maximum charge temperature and a maximum discharge temperature, the maximum charge temperature of the battery cells being less than the maximum discharge temperature, the phase change material being adapted for dissipating at least a portion of heat generated upon activation of at least a portion of the plurality of battery cells, the melting temperature of the phase change material being less than the maximum charge temperature of the plurality of battery cells.

According to another aspect of the present technology, there is provided a battery pack for a vehicle, comprising a plurality of battery modules connected to one another, each of the plurality of battery modules comprising a plurality of the battery bricks.

In some implementations of the present technology, the plurality of battery modules are connected to one another in series.

In some implementations of the present technology, the plurality of battery bricks are connected to one another in parallel.

According to yet another aspect of the present technology, there is provided a battery pack for a vehicle, comprising a plurality of bricks, each brick of the plurality of bricks comprising a phase change material block, a side of the phase change material block defining a plurality of channels, and a plurality of battery cells, each battery cell being disposed at least in part in the phase change material block; and at least one connector for electrically connecting a first one of the plurality of bricks to a second one of the plurality of bricks, the at least one connector being disposed at least partially in one of the plurality of channels.

In some implementations of the present technology, the first one of the plurality of bricks is adjacent to the second one of the plurality of bricks.

In some implementations of the present technology, the plurality of bricks are electrically connected to one another in series.

In some implementations of the present technology, the side of the phase change material block is a top side of the phase change material block.

In some implementations of the present technology, the first one of the plurality of bricks further comprises a positive current collector electrically connected to the plurality of battery cells of the first one of the plurality of bricks; the second one of the plurality of bricks further comprises a negative current collector electrically connected to the plurality of battery cells of the second one of the plurality of bricks; and the at least one connector electrically connects the positive current collector of the first one of the plurality of bricks to the negative current collector of the second one of the plurality of bricks.

In some implementations of the present technology, the battery pack further comprises at least one insulator disposed between the positive current collector of the first one of the plurality of bricks and the negative current collector of the second one of the plurality of bricks.

In some implementations of the present technology, the at least one connector is a plurality of connectors, each one of the plurality of connectors being disposed in a corresponding one of the plurality of channels.

In some implementations of the present technology, wherein for each brick of the plurality of bricks, the plurality of battery cells are arranged in an alternating pattern, wherein the plurality of battery cells are arranged in a plurality of columns, and adjacent columns of the plurality of columns are vertically staggered from one another; and at least one of the plurality of battery cells is disposed between two of the plurality of channels.

In some implementations of the present technology, the at least one connector is a metal fastener.

According to yet another aspect of the present technology, there is provided a battery pack for a vehicle, comprising a first module group comprising at least one battery module; a second module group comprising at least one other battery module; and a manually operable interrupter assembly selectively electrically connecting the first module group to the second module group in series, the interrupter assembly being adapted for opening and closing a circuit connecting the first and second module groups.

In some implementations of the present technology, a nominal voltage of each of the first and second module groups individually is less than a high voltage limit; and when the circuit is closed by the interrupter assembly, the first and second module groups are connected in series and a nominal voltage of the battery pack is greater than the high voltage limit.

In some implementations of the present technology, the high voltage limit is 60 Volts.

In some implementations of the present technology, when the circuit is closed by the interrupter assembly, the nominal voltage of the battery pack is 96 Volts; and when the circuit is opened by the interrupter assembly, the nominal voltage of each of the first and second module groups is 48 Volts.

In some implementations of the present technology, each module group comprises at least two battery modules connected in series.

In some implementations of the present technology, the first module group is mounted to a first location in the vehicle; the second module group is mounted to a second location in the vehicle; and the first location and the second location are spaced apart.

In some implementations of the present technology, each one of the at least one battery module and the at least one other battery module comprises a plurality of bricks, each brick comprising a phase change material block; and a plurality of battery cells disposed at least in part in the phase change material block.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
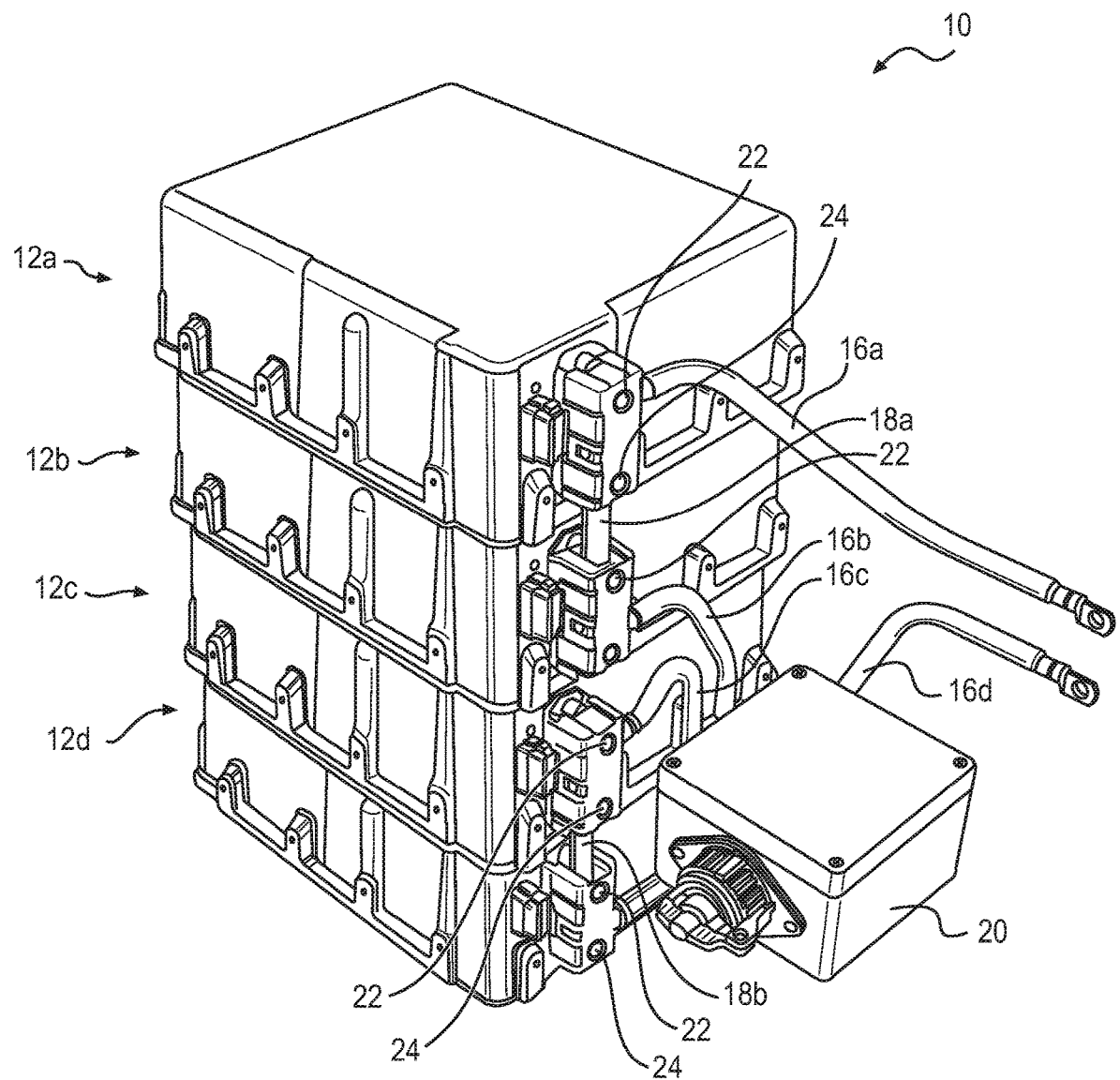
FIG. 1 is a perspective view taken from a front, right side of a battery pack.
Figure 2:
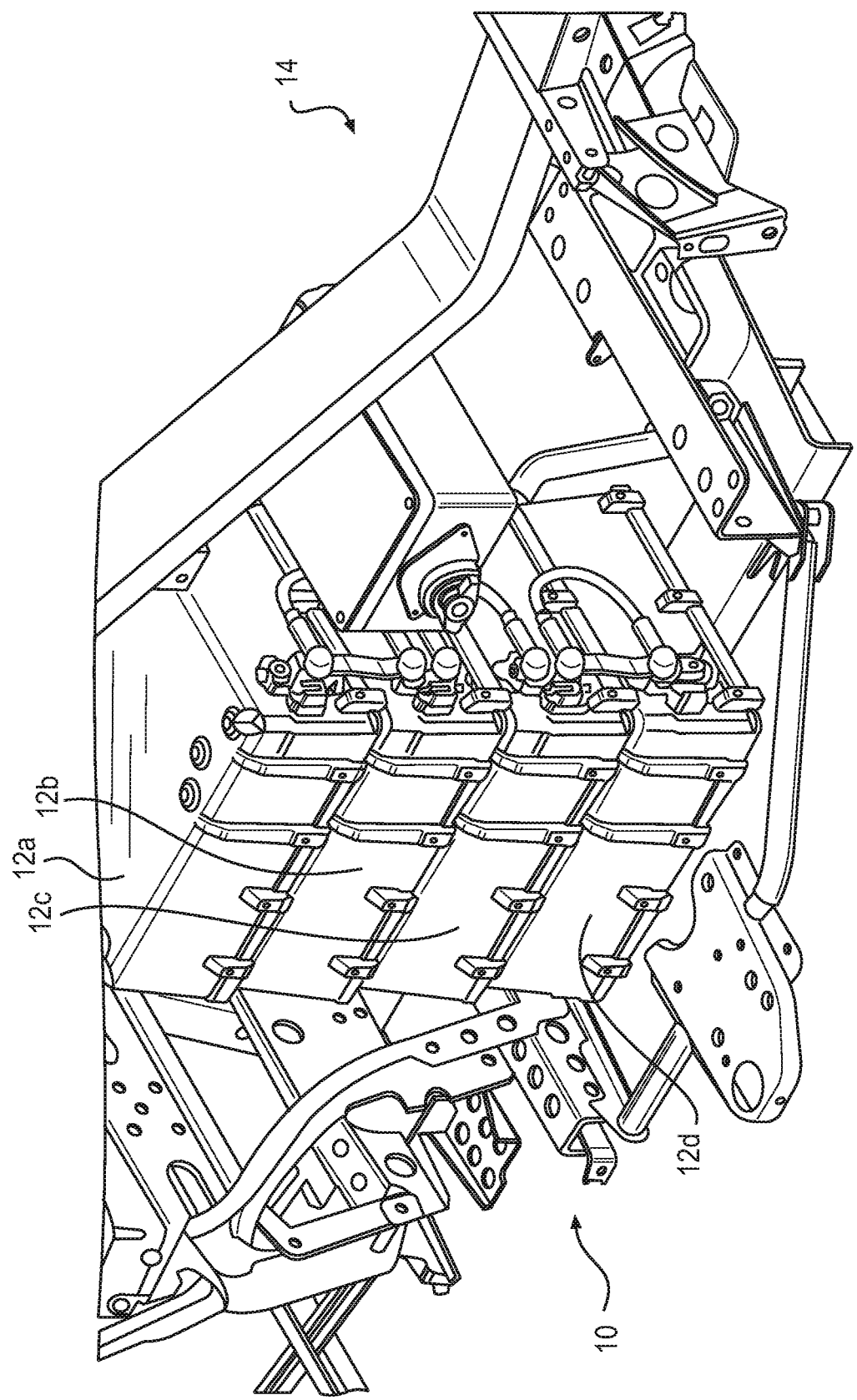
FIG. 2 is a perspective view taken from a front, right side of the battery pack of FIG. 1 mounted in the frame of a vehicle.
Figure 3:
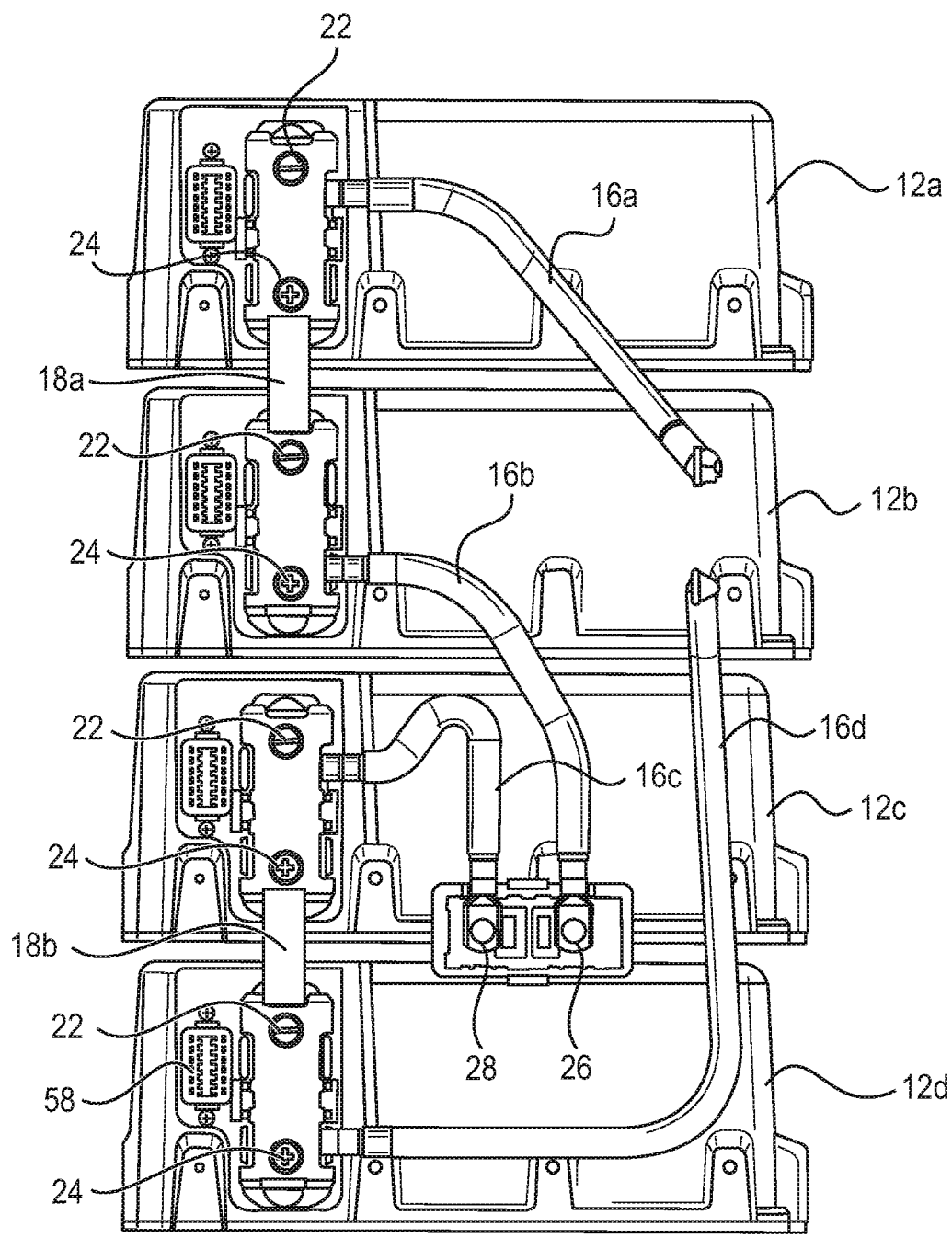
FIG. 3 is a front elevation view of the battery pack of FIG. 1.

With reference to FIGS. 1 to 3, a battery pack 10 includes four battery modules 12a to 12d arranged vertically, one atop the other. The four modules 12a to 12d of the pack 10 are mounted within the frame 14 of a vehicle. The modules 12a to 12d are connected in series via cables 16a to 16d, bus bars 18a and 18b, and switch assembly 20, hereinafter referred to as an interrupter assembly 20. The cable 16a connects the vehicle systems to a negative terminal 22 of the module 12a, the bus bar 18a connects the positive terminal 24 of the module 12a to the negative terminal 22 of the module 12b, the cable 16b connects the positive terminal 24 of the module 12b to a first terminal 26 of the interrupter assembly 20, the cable 16c connects a second terminal 28 of the interrupter assembly 20 to the negative terminal 22 of the module 12c, the bus bar 18b connects the positive terminal 24 of the module 12c to the negative terminal 22 of the module 12d, and the cable 16d connects the positive terminal 24 of the module 12d to the vehicle systems. The vehicle systems to which the cables 16a and 16d connect can include, but are not limited to, a motor controller, a charger and a DC/DC converter.

The frame 14 of FIG. 2 is that of a three-wheeled, straddle seat road vehicle, also called a roadster. It is contemplated that the vehicle could be, inter alia, a two- or four-wheeled on-road vehicle, an off-road vehicle such as an all-terrain vehicle, a side-by-side vehicle or a snowmobile, or a waterborne vessel such as a personal watercraft or boat. It is contemplated that the pack 10 could include more or less modules than the four modules 12a to 12d illustrated. As will be discussed in more detail herein below, each module has a nominal voltage of 24V and the pack 10 has a nominal voltage of 96V. Providing two modules 12 in series would provide a pack with a nominal voltage of 48V. It is also contemplated that the modules 12a to 12d could be arranged other than vertically. For example, they could be arranged in two stacks of two modules 12a to 12d. It is contemplated that the modules could be mounted within a vehicle at different locations, i.e. not all adjacent one another.

The interrupter assembly 20 is electrically connected between the modules 12b and 12c, thereby enabling the user to manually open or close the circuit between these two modules. During operation of the vehicle, the interrupter assembly 20 is closed, thereby completing the circuit between the four modules 12a to 12d. When not in operation, such as during storage or maintenance, the interrupter assembly 20 can be opened, thereby dividing the pack 10 into two halves, each with a maximum voltage of 48 volts. According to the SAE Surface Vehicle Standard J1673 MAR2012, vehicle systems that contain a circuit operating above 50 volts (DC) are considered "high voltage" and surpass a high voltage limit. Similar technical standards and/or regulations exist for other regions, such as the European Union's Directive 2006/95/EC which pertains to circuits over 75 volts (DC) and the United Nations' UNECE R100 which pertains to circuits over 60 volts (DC). As such, a vehicle comprising the battery pack 10 can be rendered "low voltage" when not in use. It will be appreciated that this can be advantageous for repairs, maintenance and the like.

Figure 4:
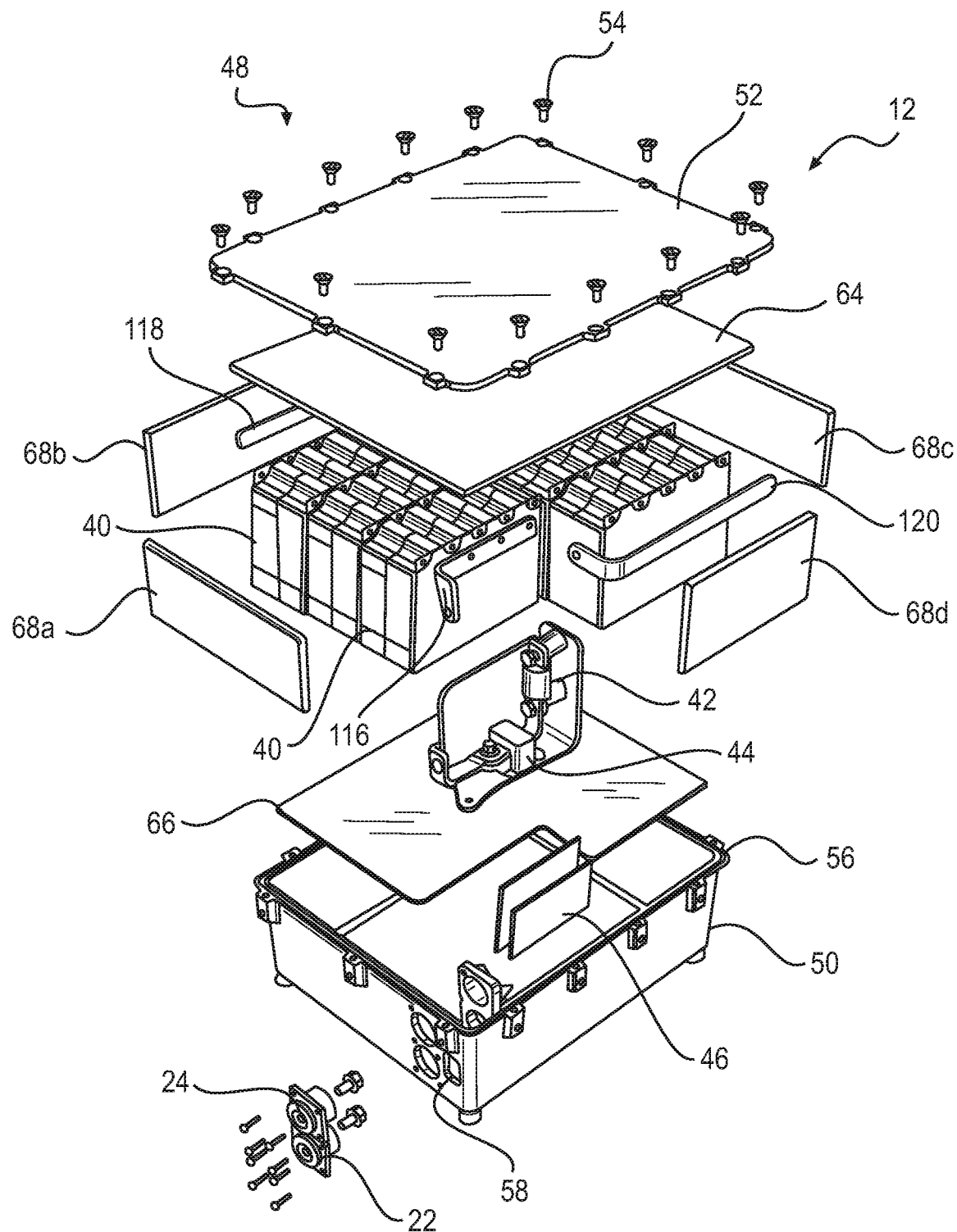
FIG. 4 is an exploded perspective view of a module of the battery pack of FIG. 1.

FIG. 4 shows an exploded view of an exemplary module 12 (i.e. the modules 12a, 12b, 12c, and 12d have a similar construction). For clarity, the module 12 has been inverted, that is to say its bottom side is facing up. The module 12 and the components thereof will hereinafter be shown in this orientation and spatial references such as "above" and "below" will, unless otherwise specified, be used in this frame of reference.

The module 12 comprises a plurality of battery sub-modules 40, hereinafter referred to as bricks 40, a fuse 42, a current sensor 44 and a battery management system (BMS) 46, all housed within a housing 48. The housing 48 includes a housing body 50 which forms a cavity in which the bricks 40 are received. The housing 48 further comprises a lid 52 which is secured to the housing body 50 by a plurality of bolts 54. A gasket 56 is positioned between the body 50 and the lid 52 in order to seal the cavity within the housing 48. A communication terminal 58 and the negative and positive terminals 22 and 24 are provided on the housing 48 so as to be accessible from outside the module 12. In one implementation, the body 50 and lid 52 are made of aluminum, although it is contemplated that other materials are possible.

Each brick 40 comprises a plurality of battery cells 60 surrounded by a PCM block 62 made of a PCM material, as will be described in further detail herein below with reference to FIG. 5. During assembly, a layer of thermally conductive filler 64 is applied between the lid 52 and the plurality of bricks 40 so as to increase thermal conduction therebetween. In the present implementation, the thermally conductive filler 64 is thermal silicone (also called thermal grease) which is applied during assembly in the form of a highly viscous liquid and hardens thereafter, filling any gaps between the bricks 40 and the lid 52. It is contemplated that various types of thermal silicone, or other highly viscous thermally conductive filler materials, could be used in the present application. The application of a suitable layer of thermal silicone during assembly can help accommodate for any variations in the dimensions of the bricks 40 or the housing 48, thereby allowing for greater tolerances while maximizing thermal conduction between the bricks 40 and the housing 48.

Another layer of thermal silicone 66 is applied between the bricks 40 and the wall of the body 50 opposite the lid 52, which is similarly intended to increase thermal conduction between the bricks 40 and the housing 48. In use, heat generated within the cells 60 of each brick 40 can be dissipated through the thermal silicone 64 and 66, and through the metallic housing 48 to the environment.

It is contemplated that an active heat exchange system, such as liquid cooling or forced air, could be added to the structure illustrated herein in order to further aid in cooling the cells 60. In particular, it is contemplated that the lid 52, or another part of the housing 48, could be provided with a liquid heat-exchanger in order to draw more heat away from the module 12. Alternatively, fans could be provided proximate the lid 52, or another part of the housing 48, to force cooling air across the module 12. The housing 48 could also be provided with heat-exchange fins to encourage cooling. It is also contemplated that the lid 52, or other part of the housing 48, could be provided with a heating element for ensuring the cells 48 are warm enough when operating in a cold environment.

In order to ease assembly, the cavity formed within the body 50 has a tapered shape and four foam wedges 68a to 68d are positioned between the lateral walls of the body 50 and the bricks 40. The wedges 68a to 68d can be formed, inter alia, from neoprene, plastic, polystyrene foam or the like, either alone or in combination. Additional layers of thermal silicone or another thermally conductive filler could be used in place of the wedges 68a to 68d.

Figure 5:
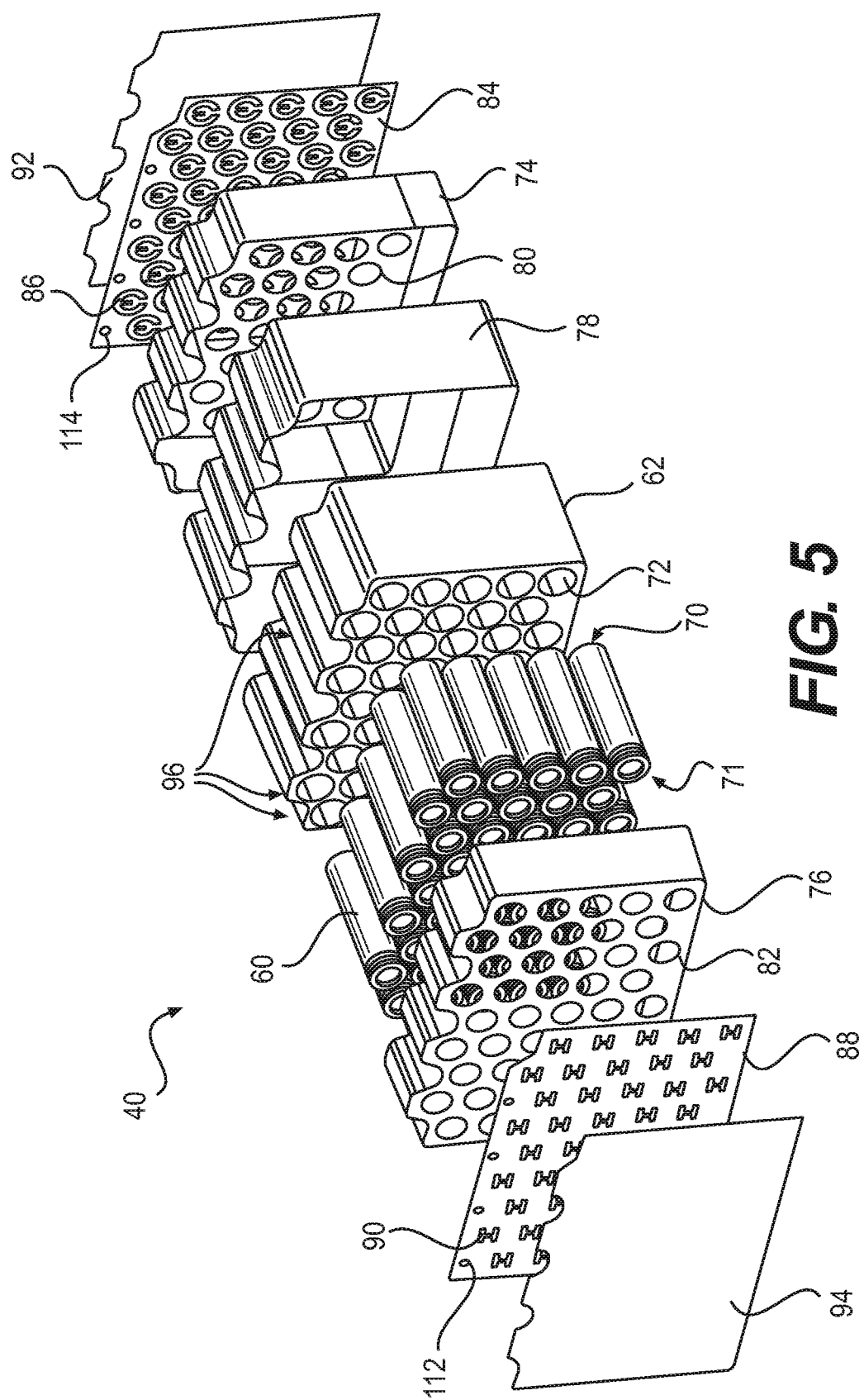
FIG. 5 is an exploded perspective view of a brick of the module of FIG. 4.

FIG. 5 shows an exploded view of an exemplary brick 40. As mentioned above, the bricks 40 each comprise a plurality of battery cells 60 surrounded by the PCM block 62. More particularly, each brick 40 comprises a total of 45 cells 60. The cells 60 are cylindrical in shape with negative and positive terminals 70 and 71 at either extremity. It is contemplated that the cells 60 are 18650 or 26650 cells, although other sizes could also be used. It is contemplated that the cells 60 could be other than cylindrically shaped. It is also contemplated that more or less cells 60 could be provided per brick 40. In particular, it is contemplated that between 10 and 60 cells per brick 40 could be provided.

The PCM block 62 comprises a plurality of slots 72, one for each of the plurality cells 60. Each slot 72 is sized to correspond to the length of a corresponding cell 60. The thickness of the PCM block 62 equals that of the cells 60 and each slot 72 extends through the entire thickness of the PCM block 62. When assembled, the negative and positive terminals 70 and 71 of each cell 60 are flush with the faces of the PCM block 62 at the extremities of their respective slots 62. It is also contemplated that the thickness of the PCM block 62 could be less than the length of the cells 60, such that their negative and positive terminals 70 and 71 protrude beyond the PCM block 62, or that the thickness of the PCM block 62 could be greater than the length of the cells 60.

The diameter of each slot 72 is sized to correspond with the diameter of the cells 60. In the implementation illustrated herein, the slots 72 are sized so as to ensure as much contact between the cells 60 along their lateral sides as possible in order to maximize the transmission of heat therebetween, although other arrangements are possible. The cells 60 are oriented such that all of the negative terminals 70 are on one side of the PCM block 62 and all the positive terminals 71 are on the other. Referring to the frame of reference of FIG. 5, the negative terminals 70 face rearward and the positive terminals 71 face forward.

Each brick 40 comprises first, second and third electrical insulators 74, 76 and 78 which surround the PCM block 62. When assembled, the outwardly-facing surfaces of the PCM block 62, i.e. those which are not facing and/or in contact with the lateral sides of the cells 60, are covered by a combination of the first, second and third electrical insulators 74, 76 and 78.

The first electrical insulator 74 covers the rearward-facing side of the PCM block 62 and comprises openings 80 for each negative terminal 70. The first electrical insulator 74 also extends halfway across the top, bottom, left and right sides of the PCM block 62, from the rearward-facing side towards the forward-facing side.

The second electrical insulator 76 is a mirror image of the first electrical insulator 74. It covers the forward-facing side of the PCM block 62 and comprises openings 82 for each positive terminal 71. The second electrical insulator 76 also extends halfway across the top, bottom, left and right sides of the PCM block 62, from the forward-facing side towards the rearward-facing side. When assembled, the first and second electrical insulators each cover half of the outwardly-facing surfaces of the PCM block 62.

The third electrical insulator 78 extends around the top, bottom, left and right faces of the PCM block 62. The third electrical insulator 78 covers the seam between the first and second electrical insulators 74 and 76. With the first, second and third electrical insulators in position around the PCM block 62 and the cells 60, only the negative and positive terminals 70 and 71 are uncovered.

Each brick 40 further comprises a negative current collector 84 which is positioned adjacent and across the first electrical insulator 74. The first electrical insulator 74 separates the negative current collector 84 from the rearward-facing side of the PCM block 62, but the openings 80 allow contact between the negative current collector 84 and the negative terminals 70 of each cell 60. To ensure a conductive connection, the negative current collector 84 and the negative terminal 70 of each cell 60 are ultrasonically welded to each other, although it is contemplated that other means of ensuring a conductive connection could be used, such as laser welding or friction welding.

Each brick 40 further comprises a positive current collector 88 which is positioned adjacent and across the second electrical insulator 76. The second electrical insulator 76 separates the positive current collector 88 from the forward-facing side of the PCM block 62, but the openings 82 allow contact between the positive current collector 88 and the positive terminals 71 of each cell 60. To ensure a conductive connection, the positive current collector 88 and the positive terminals 71 of each cell are friction welded to each other, although it is contemplated that other means of ensuring a conductive connection could be used.

The negative and positive current collectors 84 and 88 are formed from sheets of conductive material, such as nickel, copper or the like, either alone or in combination. The negative and positive current collectors 84 and 88 of the current implementation each comprise a sheet of nickel welded to a sheet of copper. Both sheets are 10 thousandths of an inch (0.254 mm) thick, giving a total thickness of 20 thousandths of an inch (0.508 mm). The negative current collector 84 comprises a plurality of contact portions 86, one for every opening 80. When assembled, each contact portion 86 is positioned opposite a respective opening and a respective negative terminal 70. The contact portions 86 each have a forked shape with two branches that are friction welded to the corresponding negative terminal 70 and a thinner base that connects the welded branches to the remainder of the negative current collector 84.

The positive current collector 88 comprises a plurality of contact portions 90, one for every opening 82. When assembled, each contact portion 90 is positioned opposite a respective positive terminal 71. The contact portions 90 each comprise two tabs formed by H-shaped cut-outs in the positive current collector 88. The two tabs are each friction welded to the corresponding positive terminal 71.

Each brick 40 further comprises fourth and fifth electrical insulators 92 and 94 which form its rearward-most and forward-most layers respectively. The fourth and fifth electrical insulators 92 and 94 each cover a substantial portion of the rearward-and forward-facing faces of the negative and positive current collectors 84 and 88, respectively. The first, second, third, fourth and fifth electrical insulators 74, 76, 78, 92 and 94 of the present implementation are formed from sheets of electrical insulation paper, such as ThermaVolt™ manufactured by 3M™, which is held in place by an adhesive backing.

The cells 60 are arranged within the PCM block 62 in an alternating pattern that forms a plurality of channels 96 across the top of the PCM block 62. The first, second, third, fourth and fifth electrical insulators 74, 76, 78, 92 and 94 comprise corresponding shapes along their upper sides/edges. The present implementation of the PCM block 62 and the 45 slots 72 that receive the 45 cells 60 are shown in more detail in FIGS. 6a and 6b. The slots 72 are aligned in nine columns 98a to 98i of five slots 72 each, i.e. the longitudinal axis 100a of a given slot 72 will be aligned with the longitudinal axes 100b and 100c of the slots 72 above and below it. Each column 98a to 98i is offset vertically from the adjacent column(s) to the left and/or to the right of it, i.e. the longitudinal axis 100a of the slot 72 will not be aligned with longitudinal axes 100e to 100h of the slots 72 to the left and to the right of it. As such, a given cell 60 will have another cell 60 immediately above and/or below it at the same horizontal position across the width of the PCM block 62 (thereby forming the columns 98a to 98i), but the cells 60 to the left and/or right of it will not be at the same vertical position across the height of the PCM block 62. In the present implementation, the longitudinal axes 100e to 100h are vertically offset from the longitudinal axis 100a (either upwards or downwards) by half the distance between the longitudinal axes 100a and the longitudinal axes 100b and 100c above and below it. This alternating pattern permits a tighter packing of the cells 60 within the PCM block 62 and a reduction in the width of the PCM block 62. Staggering the cells 60 in this way also allows the formation of channels 96a to 96e along the top side of the PCM block 62 beside and between the second, fourth, sixth and eighth columns 98b, 98d, 98f and 98h.

Figure 6A:
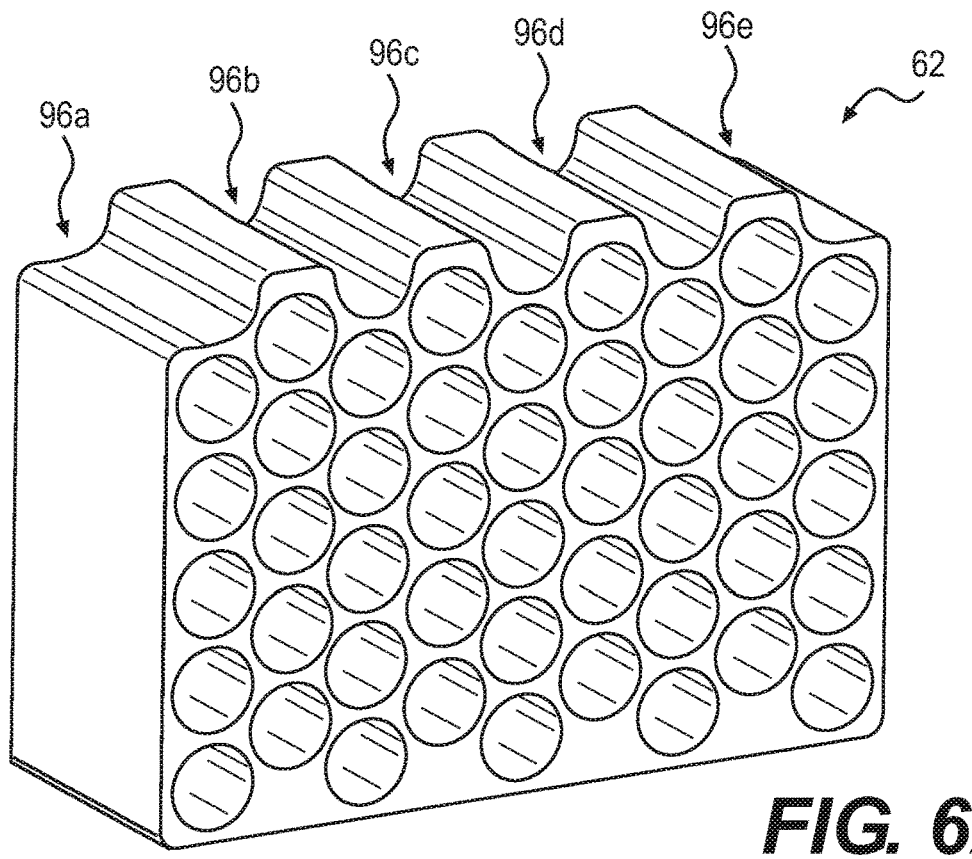
FIGS. 6a and 6b are perspective and front views, respectively, of a PCM block of the brick of FIG. 4.
Figure 6B:
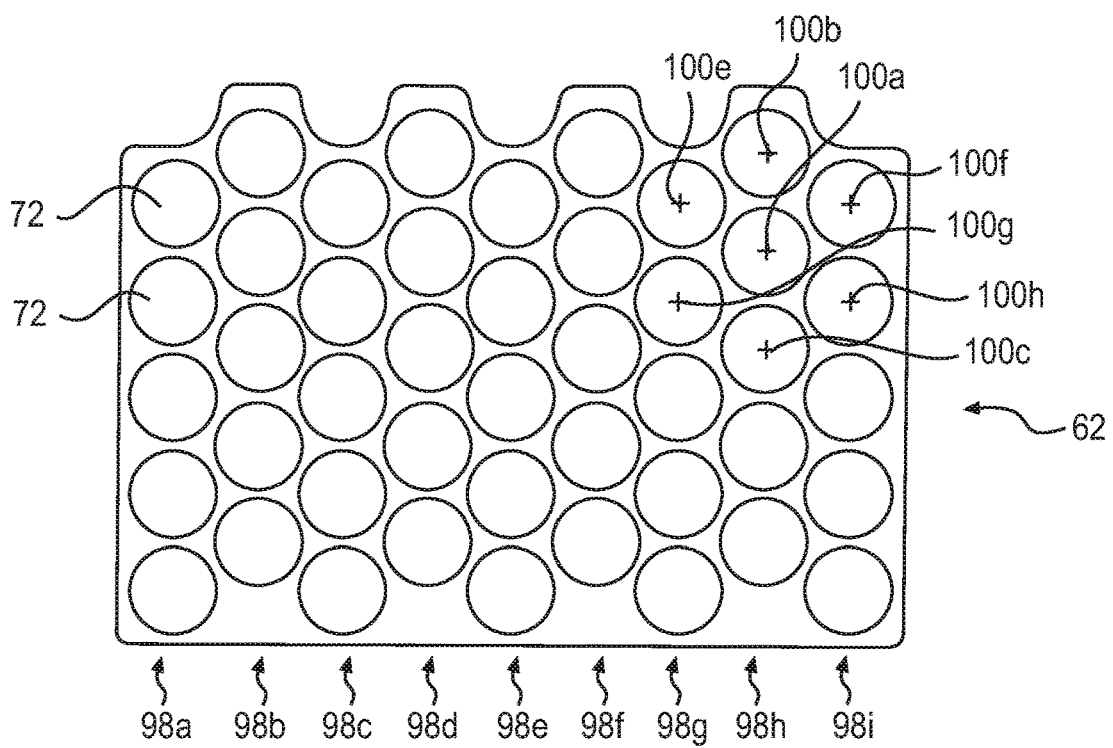

It is contemplated that channels similar to those shown in FIGS. 6a and 6b could be provided along the bottom side of the PCM block 62 either in addition to or in place of the channels 96a to 96e. While the present implementation comprises an alternating pattern of columns, it is contemplated that the cells 60 and slots 72 could similarly be arranged in an alternating pattern of rows that form channels along the left and/or right sides of the PCM block 62.

The modules 12 shown in the present implementation each comprise seven bricks 40, although it is contemplated that more or less bricks 40 could be provided per module 12. It is contemplated that between six and 20 bricks 40 could be provided. The cells 60 of the brick 40 are connected in parallel via the negative and positive current collectors 84 and 88 which connect the negative and positive terminals 70 and 71, respectively, of each cell. The seven bricks 40 of each module 12 are connected in series, that is to say the negative current collector 84 of one brick 40 is connected to the positive current collector 88 of an adjacent brick 40 such that the voltage of the module 12 is the sum of the voltages of the bricks 40 therein. As discussed above, the four modules 12 are also connected in series.

Figure 7:
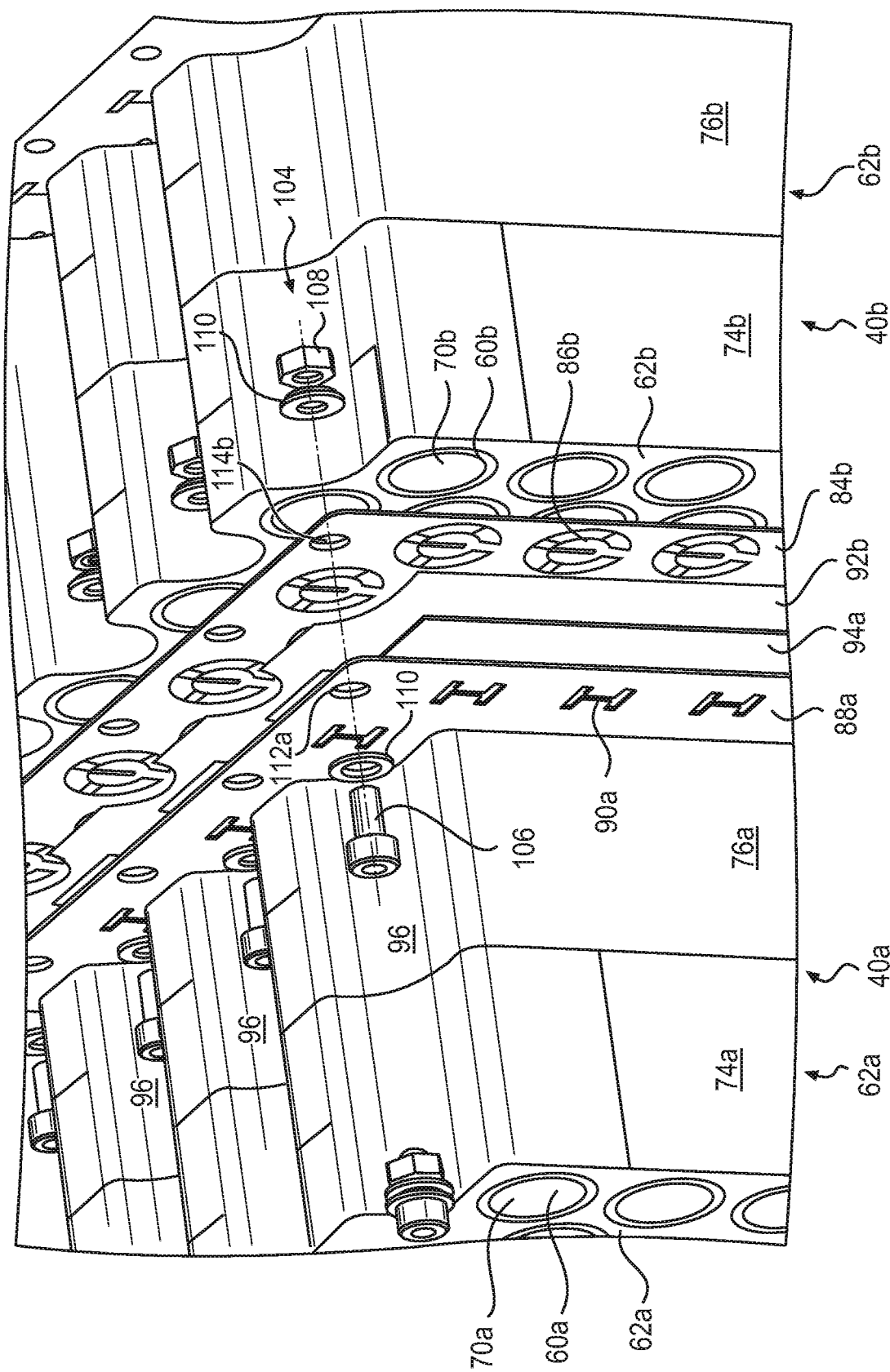
FIG. 7 is an exploded perspective view of portions of two adjacent bricks of the module of FIG. 4.

With reference to FIG. 7, two exemplary bricks 40a and 40b are shown in a partially exploded state to illustrate the connection therebetween. For clarity, the elements of the left brick 40a (with respect to the frame of reference of FIG. 7) are labeled with the suffix "a" while, similarly, the elements of the adjacent right brick 40b are labeled with the suffix "b". When assembled, the fifth electrical insulator 94a of the left brick 40a is adjacent the fourth electrical insulator 92b of the right brick 40b. The presence of the electrical insulators 94a and 92b separate the negative and positive current collectors 88a and 84b, except along their upper edges where they will be connected as described below. The electrical insulators 94a and 92b prevent the contact portions 90a of the positive current collector 88a from coming into contact with the contact portions 86b of the negative current collector 84b.

The positive and negative current collectors 88a and 84b of the adjacent bricks 40a and 40b are electrically connected by a plurality of connectors 104 which are embodied herein by bolts 106, nuts 108 and washers 110. Each bolt 106 passes through a hole 112a in the positive current collector 88a and a corresponding hole 114b in the negative current collector 84b. The washers 110 sandwich the portion of the negative and positive current collectors 88a and 84b around the holes 112a and 114b, ensuring a contact therebetween. In addition, the bolts 106, nuts 108 and washers 110 are metallic and can conduct current between the bricks 40a and 40b. The holes 112a and 114b are located along the top edge of the positive and negative current collectors 88a and 84b, respectively, such that the bolts 106, the nuts 108 and the washers 110 are located in the channels 96. In the present implementation, there are four pairs of holes 112a and 114b, each within a channel 96. It will be appreciated that various alternative ways of connecting negative and positive current collectors 88a and 84b, such as welding, rivets, clamps, clips and the like. It is also contemplated that adjacent current collectors 88a and 84b could be formed from a single conductive sheet folded in half with one or both of the electrical insulators 94a and 92b therebetween.

Figure 8:
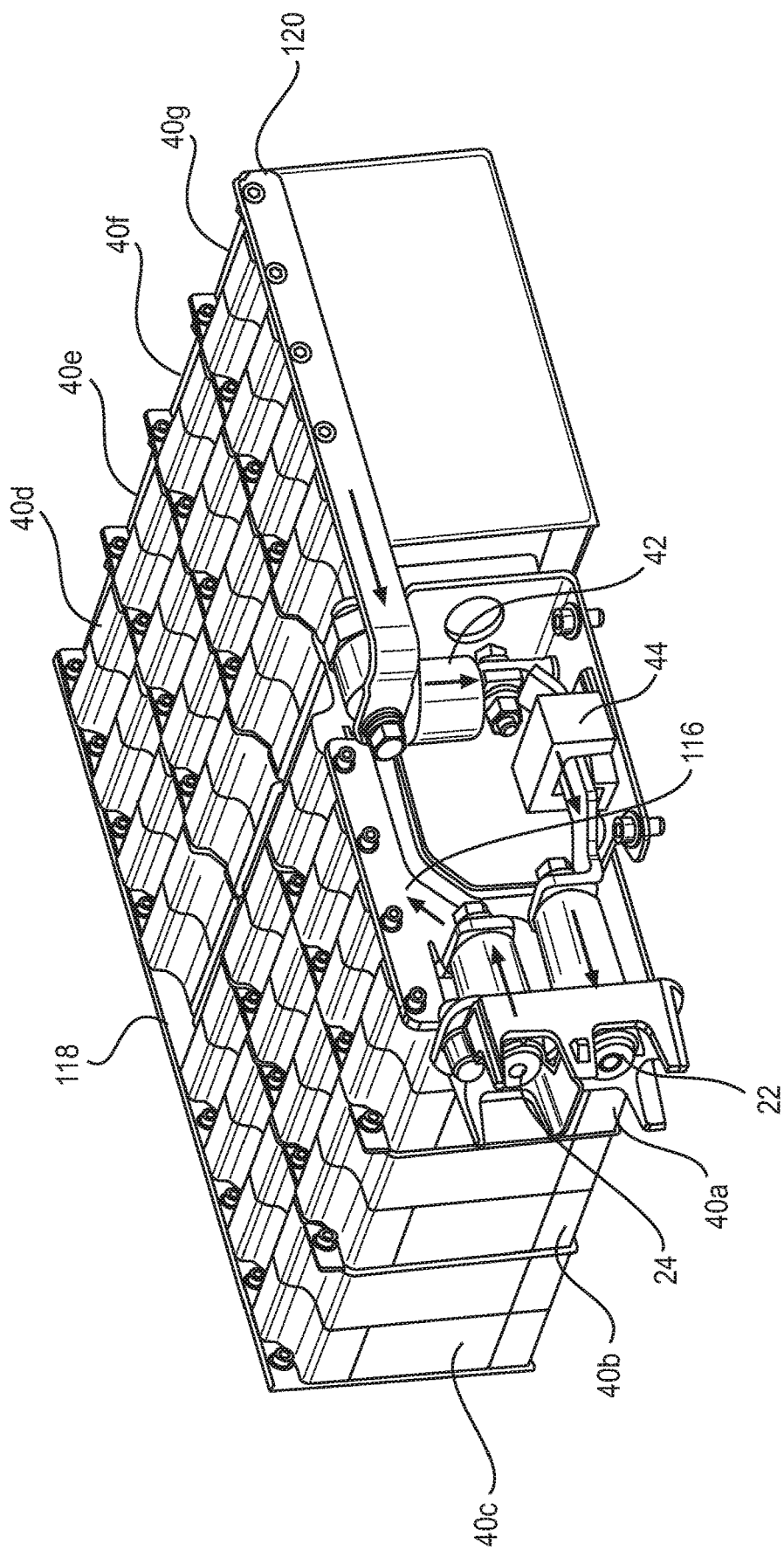
FIGS. 8 and 9 are perspective views taken from opposite sides of portions of the module of FIG. 4.
Figure 9:
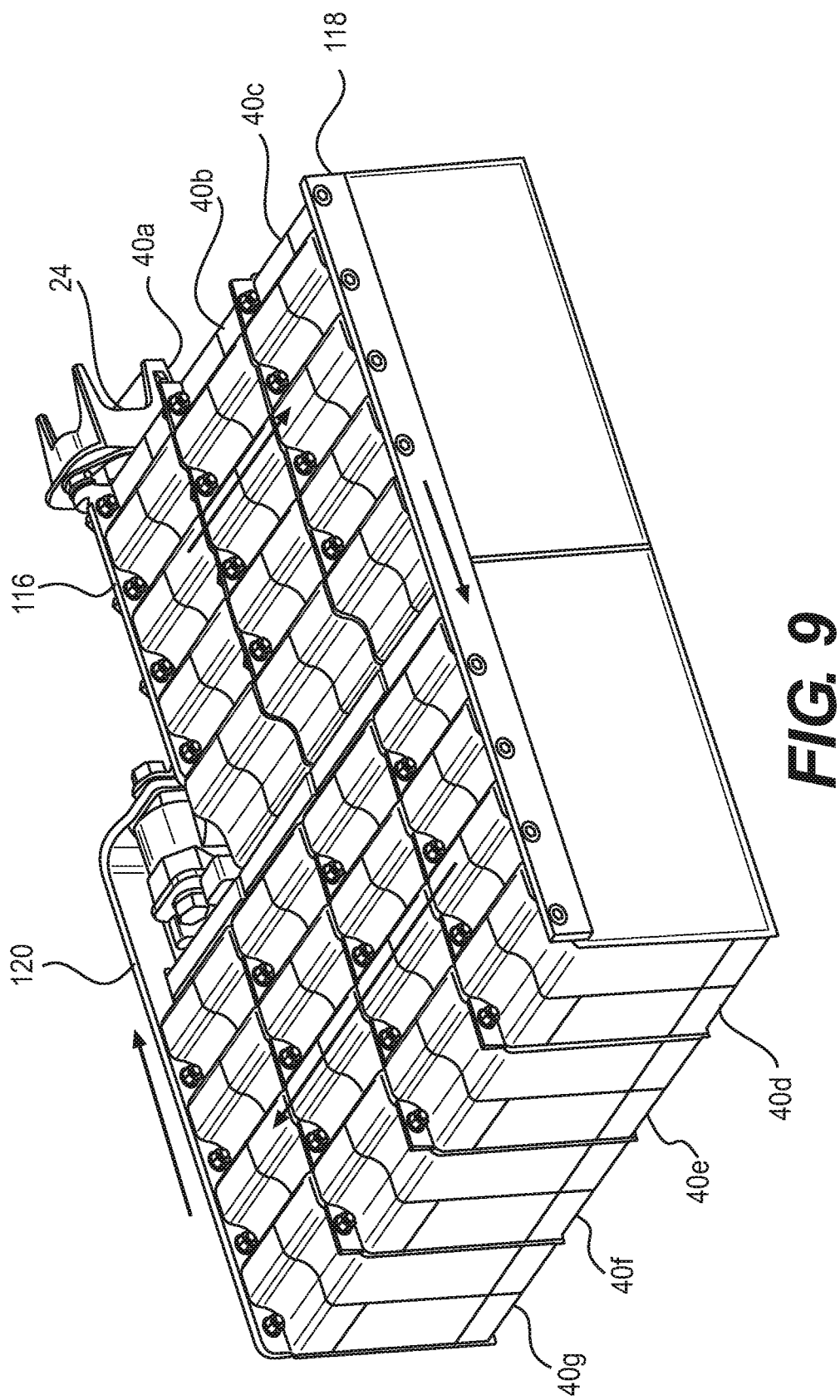

FIGS. 8 and 9 show seven bricks 40a to 40g connected in series between the positive and negative terminals 24 and 22. The charge path (indicated in with arrows and representing a positive current direction as seen by the BMS 46) begins at the positive terminal 24 which his connected to the first brick 40a via a first bus bar 116. The first bus bar 116 is connected to the positive current collector 88 of the first brick 40a via connectors 104 which engage the holes 112 of the first brick 40a and a corresponding set of holes (not shown) in the bus bar 116 in a manner similar to that described above. The negative current collector 84 of the first brick 40a is connected to the positive current collector 88 of the second brick 40b, the negative current collector 84 of the second brick 40b is connected to the positive current collector 88 of the third brick 40c, and the negative current collector 84 of the third brick 40c is connected to a second bus bar 118. These connections are all made via connectors 104 which engage holes 112 and/or 114.

The charge path continues through the second bus bar 118 to the positive current collector 88 of the fourth brick 40d. The negative current collector 84 of the fourth brick 40d is connected to the positive current collector 88 of the fifth brick 40e, the negative current collector 84 of the fifth brick 40e is connected to the positive current collector 88 of the sixth brick 40f, the negative current collector 84 of the sixth brick 40f is connected to the positive current collector 88 of the seventh brick 40g, and the negative current collector 84 of the seventh brick 40g is connected to a third bus bar 120. Again, these connections are all made via connectors 104 which engage holes 112 and/or 114.

The charge path continues from the third bus bar 120 to the fuse 42, the current sensor 44 and ends at the negative terminal 22. The internal components of the negative and positive terminals 22 and 24, the bus bar 116, the current sensor 44, the fuse 42 and the BMS 46 (not shown in FIGS. 8 and 9) occupy a space roughly the size of a brick 40. The present architecture of seven bricks 40 and the accompanying electrical and electronic components form a substantially U-shaped package within the module 12. It is contemplated that the bricks 40 could be arranged and connected in other formations, such as in a single line, in an S shape or and M shape.

The BMS 46 of each module 12 monitors and logs the temperature and voltage of each brick 40, and the current through the module 12 (via the sensor 44) to ensure these parameters stay within their operational limits. The BMS 46 can register fault and/or error codes when those limits are exceeded. The BMS 46 also calculates the state of charge and state of health of the module 12 and bricks 40. Each BMS 46 outputs this information via the communication terminal 58 to the vehicle's CAN-bus network to a vehicle control module (not shown) that also communicates with the vehicle's motor controller(s).

The cells 60 are lithium-ion rechargeable cells. More particularly, they are lithium-nickel-manganese-cobalt cells (NMC), although other types of cells are contemplated. For example, it is contemplated that the cells 60 could be lithium-nickel-cobalt-aluminum (NCA), lithium-manganese-spinel (LMO), lithium-titanate (LTO), lithium-iron-phosphate (LFP) cells or lithium sulfur (Li—S). The nominal voltage of each NMC cell 60 is 3.65V. Accordingly, the voltage of each brick 40 is 3.65V, the voltage of each module 12 comprising seven bricks 40 is 25.55V and the voltage of each pack 10 comprising four modules 12 is 102.2V. Such a module is said to have a nominal voltage of 24V and such a pack 10 is considered to have a nominal voltage of 96V. In the present implementation, each module 12 has 2.5 kwh at 24V resulting in 10 kwh at 96V with 30 kW continuous power and 55 kW peak power for the pack 10. It will be appreciated that NCA cells have an equivalent voltage to NMC cells and as such the resultant voltages of the bricks 40, modules 12 and packs 10 comprising NCA cells would be equivalent to those of the NMC cells 60. It is contemplated that a 120V pack 10 comprising Li—S cells having a nominal voltage of 2.2V could also be provided.

The PCM block 62 acts as a heat sink during discharge of the cells 60. Preventing the cells 60 from getting too hot during discharge is important to both prevent thermal runaway and protect the cells from damage which could reduce their performance and lifespan, as is maintaining an even temperature across all the cells 60 of a given brick 40. It is contemplated that the PCM block 62 could be formed from a wax and graphite matrix PCM material, such as the Phase Change Composite (PCC™) material manufactured by Allcell. During discharge, as the cells 60 heat up, the PCM block 62 thermally conducts that heat to spread it out evenly across the brick 40. As the temperature of the brick 40, or any parts thereof, approaches the melting point of the PCM block 62 ($T_{melt}$), heat energy begins to be absorbed by the melting (i.e. phase change) process. The proportion of the PCM block 62 that has melted at a given moment is referred to as the liquid fraction. When the liquid fraction has reached 100%, every part of the brick 40 will have reached $T_{melt}$ and the PCM material can absorb no further heat. Once discharge has stopped, the PCM block 62 will release the heat absorbed during discharge to the surrounding environment and the liquid fraction will eventually return to 0%.

Different PCM materials will have different $T_{melt}$, for example PCM materials are available that have 43° C., 48° C. or 55° C. The PCM block 62 is selected so that the $T_{melt}$ is below a maximum desired operating temperature during discharge ($T_{max-discharge}$) in order to help prevent thermal runaway and damage to the cells 60 and above the maximum ambient temperature of operation of the battery pack 10. For example, in the present implementation the $T_{max-discharge}$ of the cells 60 is 60° C. The PCM block 62 is therefore selected to have a $T_{melt}$ lower than 60° C. It is common to select PCM material that has the highest $T_{melt}$ lower than the $T_{max-discharge}$.

However, the cells 60 also have a maximum temperature at which they can be charged ($T_{max-charge}$). $T_{max-charge}$ is typically less than $T_{max-discharge}$. For example, the cells 60 of the present implementation have a $T_{max-charge}$ of 45° C. Cells 60 that have reached a temperature above $T_{max-charge}$ during operation (i.e. discharge) cannot be charged until the pack 10 has cooled to below $T_{max-charge}$. A conventional battery pack with cells having a $T_{max-discharge}$ of 60° C. and a PCM material having a $T_{melt}$ of 55° C. that undergoes heavy usage and discharge of the cells that necessitates absorption by the PCM material will not be able to be recharged immediately after usage since the battery pack must cool to 45° C. ($T_{max-charge}$). The PCM block 62 of the present implementation therefore comprises a PCM material with a $T_{melt}$ lower than the $T_{max-charge}$ in order to ensure that the cells 60 will be ready to be recharged immediately after they are discharged. This can be especially advantageous in implementations where quick recharging is desirable.

Figure 10:
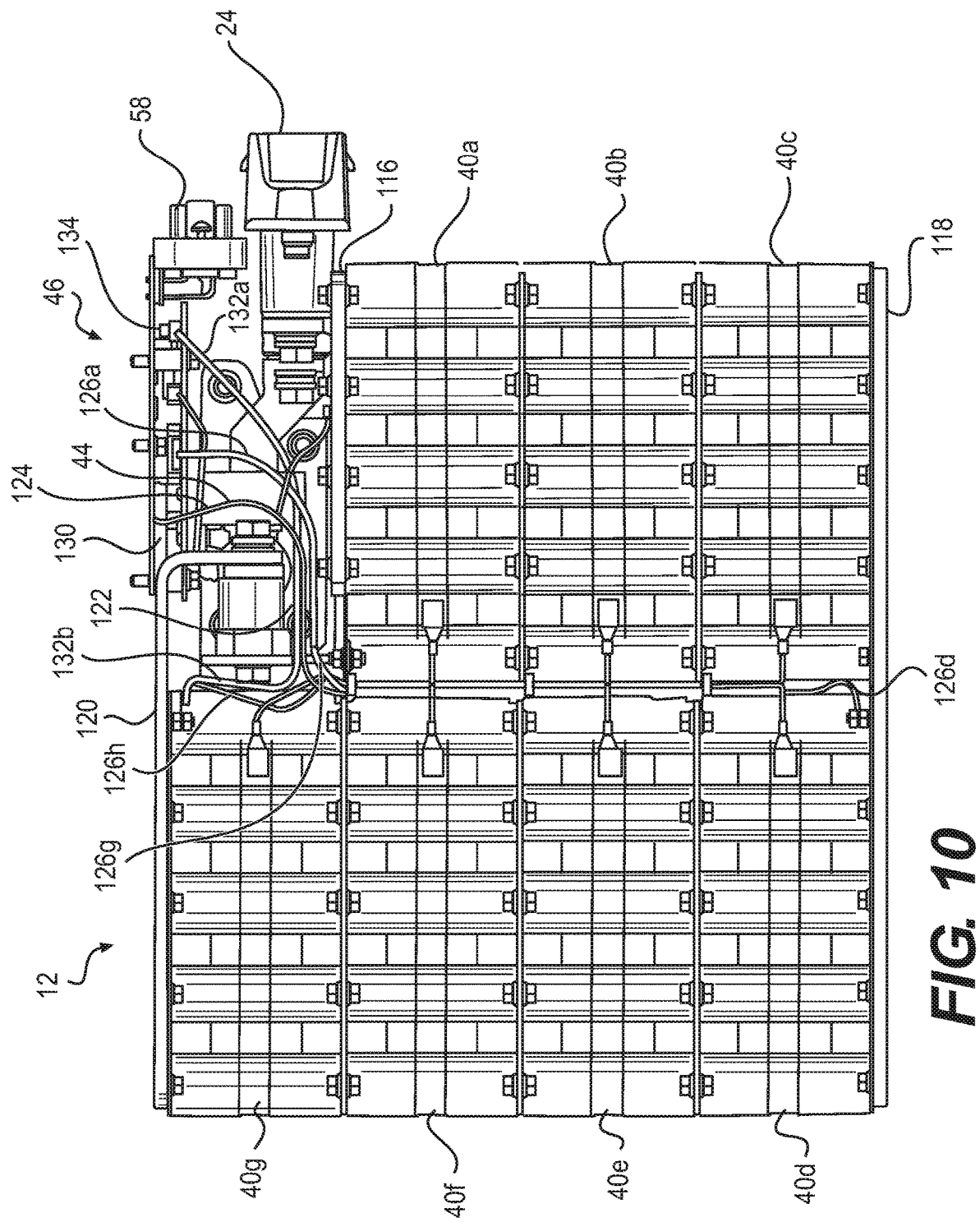
FIGS. 10 and 11 are top plan and perspective views respectively of portions of the module of FIG. 4.
Figure 11:
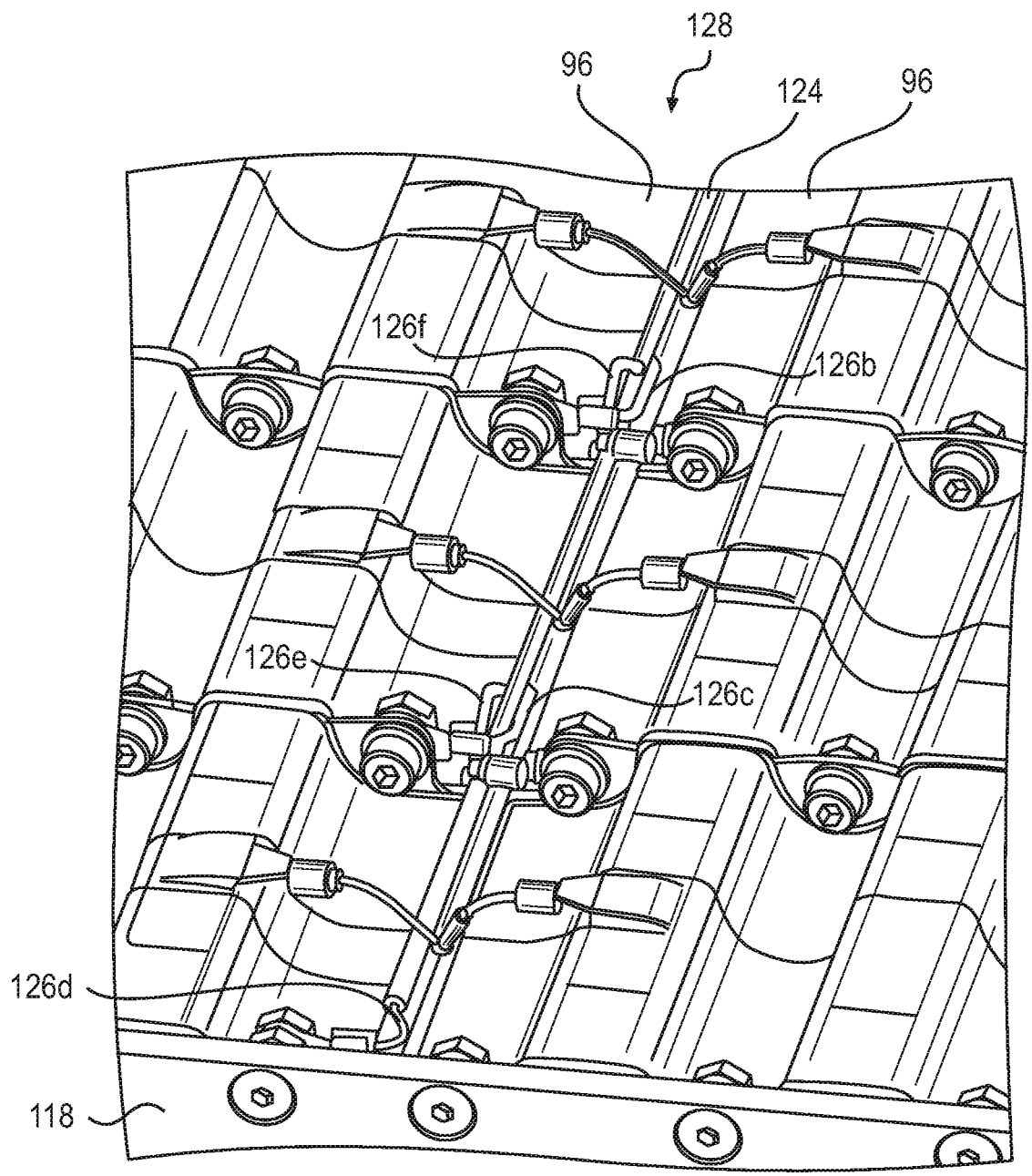

As mentioned above, the BMS 46 monitors the voltage of each brick 40. With reference to FIGS. 10 and 11, a module 12 is shown with a voltage monitoring assembly 122 which links the BMS 46 to each of the bricks 40a to 40g. The voltage monitoring assembly 112 comprises a wire harness 124 comprising eight wires 126a to 126h which connect the BMS 46 to points before and after each brick 40a to 40g. A first extremity of the first wire 126a is connected to the positive current collector 88 of the first brick 40a. A first extremity of the second wire 126b is connected to the negative current collector 84 of the first brick 40a and the positive current collector 88 of the second brick 40b. A first extremity of the third wire 126c is connected to the negative current collector 84 of the second brick 40b and the positive current collector 88 of the third brick 40c. A first extremity of the fourth wire 126d is connected to the positive current collector 88 of the fourth brick 40d and the second bus bar 118. A first extremity of the fifth wire 126e is connected to the negative current collector 84 of the fourth brick 40d and the positive current collector 88 of the fifth brick 40e. A first extremity of the sixth wire 126f is connected to the negative current collector 84 of the fifth brick 40e and the positive current collector 88 of the sixth brick 40f. A first extremity of the seventh wire 126g is connected to the negative current collector 84 of the sixth brick 40f and the positive current collector 88 of the seventh brick 40g. A first extremity of the eighth wire 126h is connected to the negative current collector 84 of the seventh brick 40g and the third bus bar 120.

The first extremities of each wire 126a to 126h are electrically connected to respective positive and negative current collectors 88 and 84 via connectors 104 in the manner described above. The harness 124 extends along a central channel 128 formed along the center of the module by the innermost channels 96 of the bricks 40a to 40g. The connections between the first extremities of the wires 126a to 126h and the bricks 40a to 40g are made within the central channel 128.

Each wire 126a to 126h comprises a second extremity opposite its respective first extremity that is connected to a voltage monitoring assembly connector 130 that plugs into the BMS 46. The BMS 46 is therefore provided with the voltage before and after each brick 46a to 46g, thereby enabling monitoring of the voltage of each brick 46a to 46g.

The harness 124 further comprises a first power wire 132a having a first extremity connected to a BMS power connector 134 and a second extremity connected to the positive current collector 88 of the first brick 40a. The voltage monitoring assembly 122 further comprises a second power wire 132b having a first extremity connected to the BMS power connector 134 and a second extremity connected to the negative current collector 84 of the seventh brick 40g and the third bus bar 120. The first and second power wires 132a and 132b provide the 24V of the module 12 to power the BMS 46.

Figure 12:
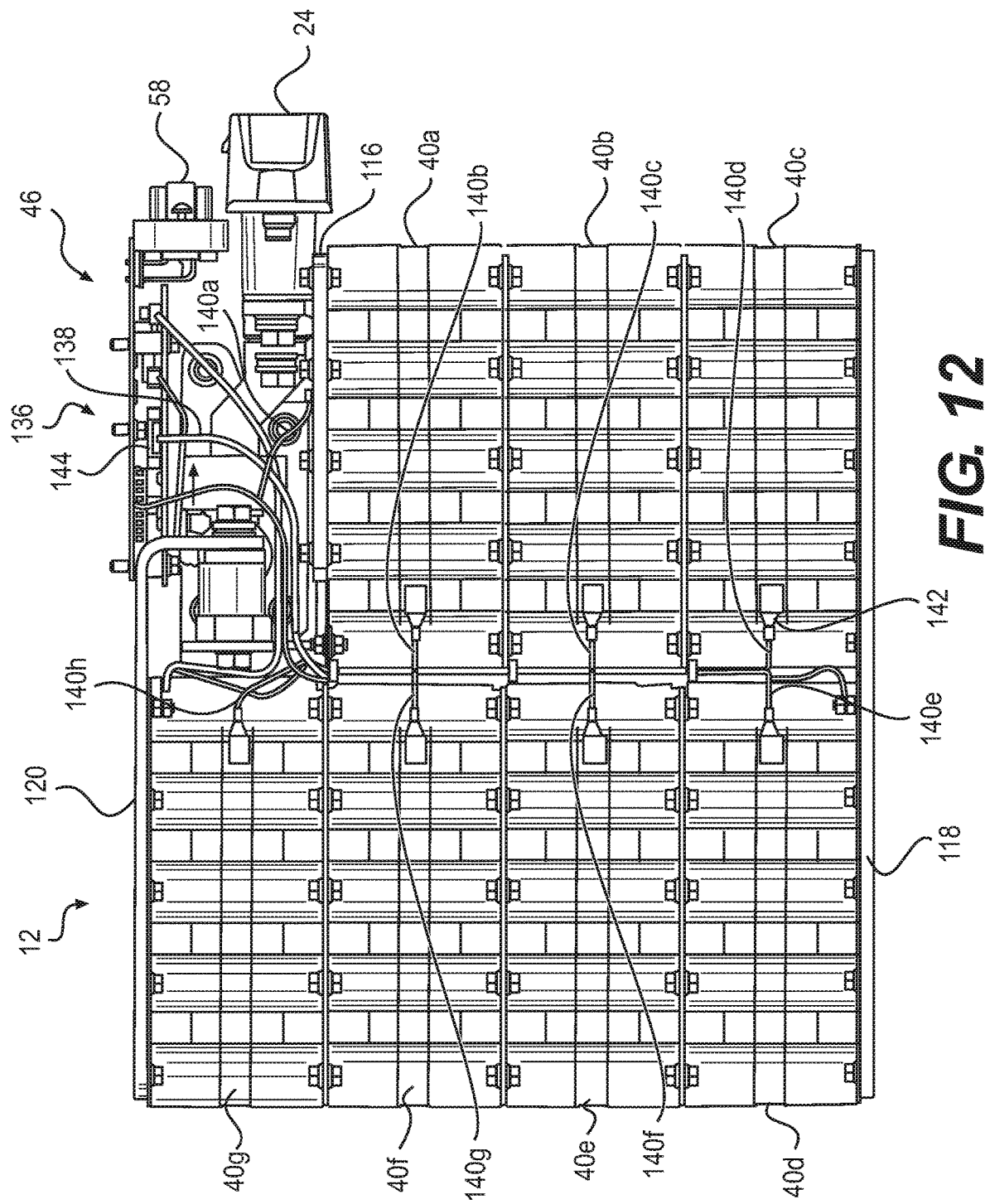
FIGS. 12 and 13 are top plan and perspective views respectively of portions of the module of FIG. 4.
Figure 13:
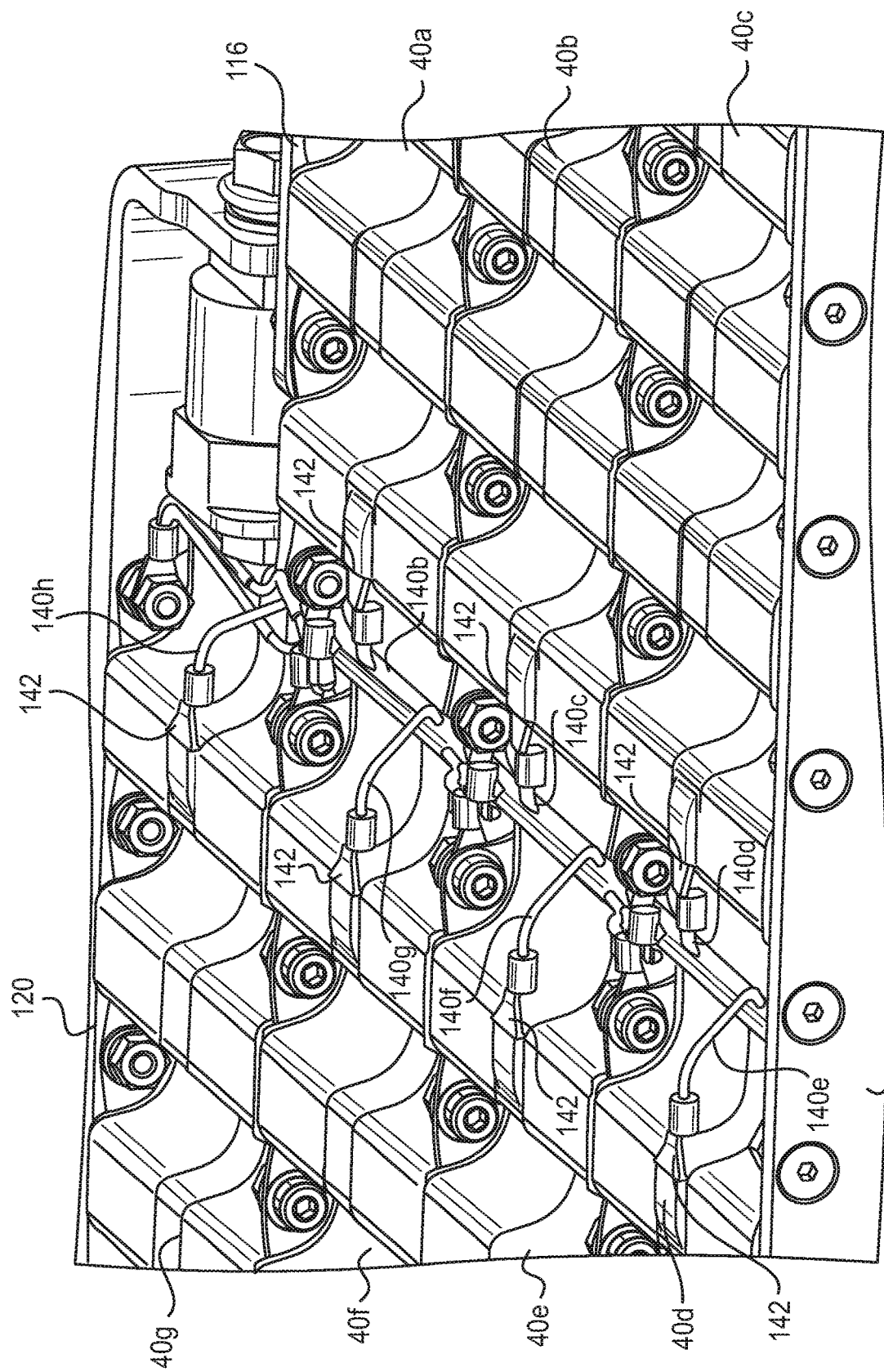

As mentioned above, the BMS 46 also monitors the temperature of each brick 40a to 40g. With reference to FIGS. 12 and 13, a module 12 is shown with a temperature monitoring assembly 136. The assembly 136 comprises a wire harness 138 comprising eight wires 140a to 140h which connect the BMS 46 to points across the module 12. The first extremity of each wire 140a to 140h is connected to a thermistor 142. The second extremity of each wire 140a to 140h is connected to a temperature monitoring assembly connector 144 that plugs into the BMS 46.

The thermistor 142 of the first wire 140a is connected, via a connector 104, to the first bus bar 116. The thermistors of the wires 140b to 140h are each in contact with a respective one of the PCM blocks 62 of the bricks 40a to 40g. Specifically, these thermistors 142 are passed through an opening in respective electrical insulators 74, 76 and/or 78 so as to contact respective PCM blocks 62 directly. The thermistors 142 can be glued or otherwise fixed in position. Like the wire harness 124 of the voltage monitoring assembly 122, the wires 140a to 140h of the wire harness 138 extend from the connector 144 through the channel 128 formed by the innermost channels 96 of the bricks 40a to 40g.

Modifications and improvements to the above-described implementations of the present technology may become apparent to those skilled in the art. The foregoing description is intended to be exemplary rather than limiting.

What is claimed is:
1. A battery brick for a vehicle, comprising:
a phase change material having a melting temperature; and a plurality of battery cells, each battery cell of the plurality of battery cells being disposed at least in part in the phase change material, the plurality of battery cells having a maximum charge temperature and a maximum discharge temperature, the maximum charge temperature of the battery cells being less than the maximum discharge temperature, the phase change material being adapted for dissipating at least a portion of heat generated upon activation of at least a portion of the plurality of battery cells, the melting temperature of the phase change material being less than the maximum charge temperature of the plurality of battery cells.

2. A battery pack for a vehicle, comprising a plurality of battery modules, the battery modules of the plurality of battery modules being connected to one another, each of the plurality of battery modules comprising a plurality of battery bricks according to claim 1.

3. The battery pack of claim 2, wherein the battery modules of the plurality of battery modules are connected to one another in series.

4. The battery pack of claim 2, wherein the plurality of battery bricks are connected to one another in series.

5. The battery pack of claim 3, wherein the plurality of battery bricks are connected to one another in series.

6. The battery pack of claim 2, wherein the plurality of battery bricks are connected to one another in parallel.

7. The battery pack of claim 3, wherein the plurality of battery bricks are connected to one another in parallel.

* * * * *